United States Patent [19]

Hartman

[11] Patent Number: 4,576,504
[45] Date of Patent: Mar. 18, 1986

[54] ELASTICALLY CONFORMABLE TAPERED PIN-KEY

[76] Inventor: Thomas A. Hartman, 700 Capac, St. Louis, Mo. 63125

[21] Appl. No.: 728,265

[22] Filed: Apr. 29, 1985

Related U.S. Application Data

[63] Continuation-in-part of Ser. No. 496,003, May 19, 1983.

[51] Int. Cl.⁴ ................................................ F16D 1/06
[52] U.S. Cl. .................................... 403/318; 403/355; 403/379
[58] Field of Search .............. 403/324, 378, 379, 318, 403/319, 355, 357, 358, 409

[56] References Cited

U.S. PATENT DOCUMENTS

| | | |
|---|---|---|
| 420,010 | 1/1890 | Hain . |
| 582,750 | 5/1897 | Leaycraft . |
| 867,468 | 10/1907 | Von Bechtolsheim ............. 403/358 |
| 939,933 | 11/1909 | Trautner ............................. 411/354 |
| 1,041,448 | 10/1912 | Dougherty . |
| 1,050,385 | 1/1913 | Palmgren ........................... 411/354 |
| 1,412,235 | 4/1922 | Felix . |
| 1,546,082 | 7/1925 | Kempf ................................ 411/355 |
| 1,886,177 | 11/1932 | Gairing .............................. 411/357 |
| 2,377,046 | 2/1944 | Siegerist .......................... 287/52.06 |
| 2,480,429 | 8/1949 | Wade ................................. 411/355 |
| 2,501,505 | 3/1950 | Garrison . |
| 3,391,953 | 7/1968 | Jordan ............................ 403/355 X |
| 3,428,343 | 2/1969 | Downie ............................ 287/52.05 |
| 4,411,550 | 10/1983 | Schutt et al. ..................... 403/358 |

FOREIGN PATENT DOCUMENTS

| | | | |
|---|---|---|---|
| 357967 | 11/1905 | France ............................... 403/358 |
| 912619 | 4/1946 | France ............................... 403/374 |
| 421124 | 12/1934 | United Kingdom ............... 411/354 |
| 361321 | 1/1973 | U.S.S.R. ............................. 411/355 |

Primary Examiner—Andrew V. Kundrat
Attorney, Agent, or Firm—Rogers, Howell, Moore & Haferkamp

[57] ABSTRACT

An elastically conformable tapered pin-key for securing a part and a shaft where the part has a cylindrical bore for receiving the shaft and a keyway tangentially intersecting the bore, and the shaft has a tangential groove shallower than the depth of the intersection of keyway and the bore. The pin-key comprises two cylindrical surfaces converging at a small angle, and an axial cavity defining sidewalls sufficiently thin to allow the faces to elastically deform to conform to the keyway and groove. The pin-key is placed in the keyway and preloaded so that one face conforms to and engages the surface of the keyway and the second face conforms to and engages the surface of the groove in the shaft, thereby securing the part and the shaft against relative rotational or axial movement.

19 Claims, 8 Drawing Figures

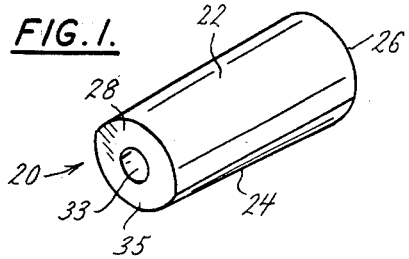
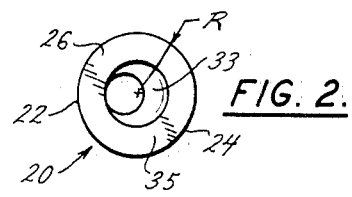
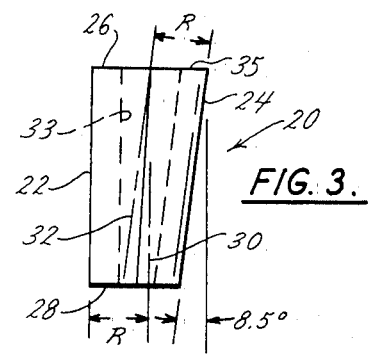
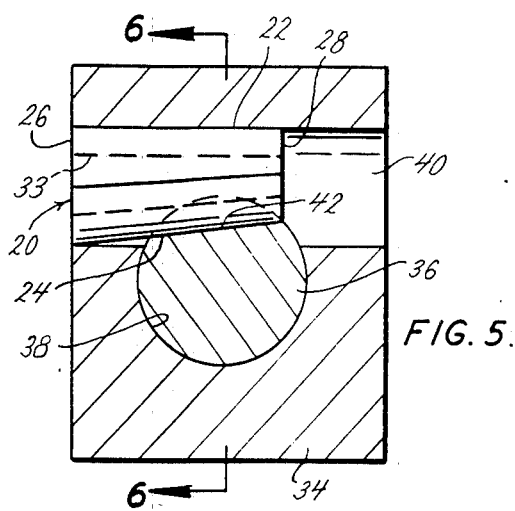
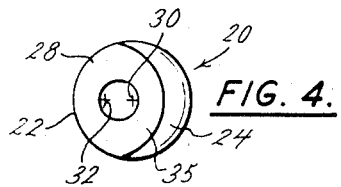
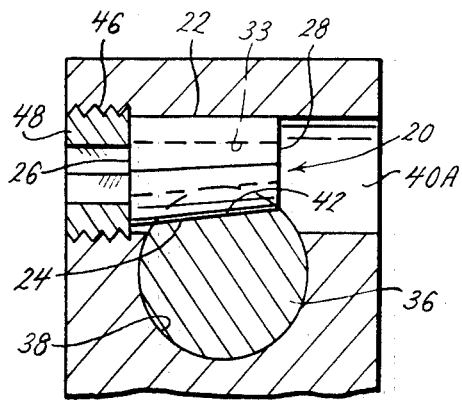
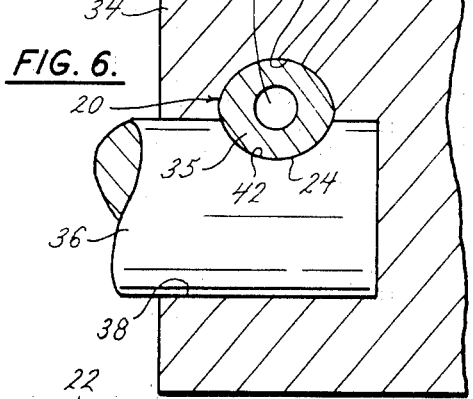
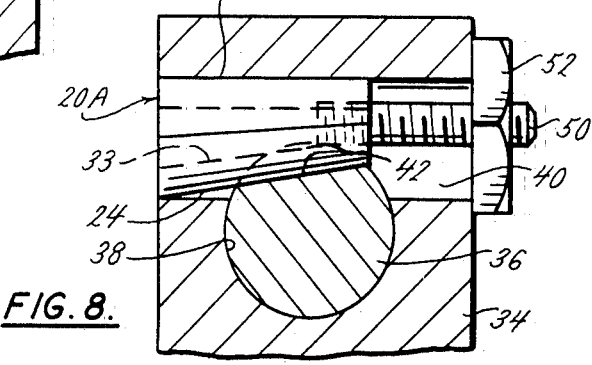

ELASTICALLY CONFORMABLE TAPERED PIN-KEY

This is a continuation-in-part of prior, co-pending application Ser. No. 496,003 filed May 19, 1983, incorporated herein by reference.

BACKGROUND AND SUMMARY OF THE INVENTION

This invention relates to tapered pin-keys for engaging a part to a shaft.

Pin-keys have long been known and used to engage a part to a shaft or vice versa. There are two broad types of pin-keys: axial pin-keys and tangential pin-keys. With either type, the part is bored to receive the shaft and the pin-key is fit into aligned keyways in the part in the shaft. With axial-type pin-keys, the keyway in the part is adjacent to and is generally parallel with the bore for the shaft, and the keyway in the shaft is generally parallel with the shaft's axis. Axial-type pin-keys secure the part against rotational or torsional loads, but do not secure the part against axial loads. With tangential-type pin-keys, the keyway in the part intersects the bore and is oriented perpendicular to the axis of the bore. The keyway in the part can either intersect the center of the bore, in which case the keyway in the shaft would be an aligned diametrical hole, or the keyway in the part can tangentially intersect the bore, in which case the keyway in the shaft would be an aligned tangential groove in the surface in the shaft. Tangential-type pin-keys secure the part against rotational or torsional loading and also against axial loading.

One of the problems with the prior art pin-key and keyway systems was that exact alignment was required between the keyway in the part and the keyway in the shaft. If the keyway and the hole or groove in the shaft were made simultaneously by drilling the keyway with the shaft in place, it was difficult to maintain the interchangeability and replaceability of the shafts and parts because of the tendency of a drill to drift into softer material. Since the shaft and part were rarely of the same material, the drill would tend to drift from the desired line and thus each part and shaft would be slightly different. This problem was especially pronounced with tangential type keyways. Properly aligned keyways could be made but only with special equipment and time consuming and expensive shop procedures. If the part and shaft were to be separately manufactured, precise machining was required to insure that the holes and grooves were properly located. This made the shafts and parts very expensive.

While cylindrical pin-keys and keyways have been used, the majority of prior art pin-keys and key-ways were tapered. The tapered pin-keys and keyways were usually frustoconical in shape and were preferable over the cylindrical configuration because they achieve a tighter engagement between the part and shaft. The cylindrical pin-key had to be made smaller than the keyway to allow the pin-key to be inserted and removed from the keyway. Thus, there was some play between the shaft and part. In contrast, the tapered pin-key, by virtue of its narrowing configuration, could be inserted into the tapering keyway until it was firmly engaged therein on all sides, thereby eliminating the play between the shaft and part. However, while achieving a tighter engagement than the cylindrical configuration, the tapered pin-keys and keyways had a disadvantage in that they were more expensive to manufacture because their manufacture was difficult, time consuming, and required special equipment. In addition, precise alignment was needed between the keyway in the part and the keyway in the shaft.

There were some tapered pin-keys that did not require a tapering keyway. For example, there were cylindrical pin-keys with a tapering flat. This pin-key could be inserted into a cylindrical keyway in the part and engage a flat on the shaft. This type of pin-key was unsatisfactory because the flat was a stress concentrator that could cause failure of the shaft. Furthermore, the flat did not securely hold the part and shaft from axial loading. Another prior pin-key was a cylindrical pin-key with two tapering adjacent flats. The pin-key was inserted into a cylindrical keyway in the part and engaged a V-shaped groove in the shaft. This type of pin-key was also unsatisfactory because the V-shaped groove in the shaft was a stress concentrator that could cause failure of the shaft. Furthermore, the pin acted like a wedge under torsional loading which could also cause failure of the shaft.

The inventor's prior invention, which is the subject of co-pending application Ser. No. 496,004 filed May 19, 1983, and incorporated herein solved many of these problems by providing a tapered pin-key having two cylindrical surfaces converging at a small angle. The pin-key fit in a cylindrical keyway tangentially intersecting the bore for the shaft. The tangential keyway was preferable to the keyway extending through the center of the bore, because far less shaft material is removed in making a groove aligned with the tangential keyway than in making a hole aligned with a keyway intersecting the center of the bore. Thus, the shaft is left stronger, with more cross-sectional area to bear torsional or other loads. Furthermore, the surface groove has far less stress concentrating effect than the hole through the shaft, or the other shapes of the prior keyways.

The tapered configuration of the inventor's prior pin-key allowed the pin-key to achieve the firm engagement of the prior art tapered pins, but because the pin-key was formed from cylindrical surfaces, the pin-key, keyway, and groove all have cylindrical surfaces, and are thus easier and less expensive to make. Furthermore, the precise alignment of the keyway and the groove required for prior art pin-keys was no longer necessary, the pin-key being self-adjusting. Variation in the depth of the groove in the shaft is permissible.

The present invention is an improvement upon the inventor's prior tapered pin-key. The improved pin-key of this invention is similar to the prior pin-key except that it includes an axial cavity in the pin-key. The cavity is sized such that the walls of the pin-key can be elastically deformed to conform to the keyways in the part and the shaft. Thus the pin-key of this invention securely engages the part and the shaft, eliminating any play between them. The pin-key accommodates minor inaccuracies in the formation of the keyways in the shaft or in the part. Because the pin-key conforms to the keyways, it can be made with less accurate and less expensive manufacturing processes, for example casting. Inaccuracies in the shape of a pin-key are accommodated by the deformation of the pin-key.

The pin-key of this invention can be preloaded to elastically deform the pin-key to conform to the keyways before the part and shaft are put into service. One method of preloading the pin-key is to hammer it into the keyway, wedging it into engagement with the part and shaft. Alternatively, the keyway in the part can be threaded at the top so that a cap can be threaded into the keyway to retain the pin-key and to compress the pin-key. In a second alternative, a threaded stud can be provided on the bottom of the pin-key. The stud protrudes through the part when the pin-key is in the keyway. A nut is threaded onto the stud to retain the pin-key and draw the pin-key into the keyway, preloading the pin-key.

The axial cavity in the pin-key is preferably threaded so that a threaded tool can be engaged therein to aid in the removal of the pin-key from the keyway.

The pin-key of this invention permits superior engagement with the keyway in the part and the keyway in the shaft. The elastic deformation of the pin-key accommodates any inaccuracies in the formation of the keyway in the part, the keyway in the shaft, or in the pin-key itself. The pin-key can thus be made with less accurate and less expensive methods of manufacture such as casting. The pin-key of this invention can be preloaded either by physically wedging it in the keyway, by compressing it in the keyway with a threaded cap, or drawing it into the keyway by a threaded stud projecting from the bottom of the pin-key. This preloading allows the part and shaft to be securely engaged before they are put into service.

BRIEF DESCRIPTION OF THE DRAWINGS

FIG. 1 is an orthogonal view of the tapered pin-key of this invention;

FIG. 2 is a top view of the tapered pin-key;

FIG. 3 is a side view of the tapered pin-key;

FIG. 4 is a bottom view of the tapered pin-key;

FIG. 5 is a side view of the tapered pin-key as it would be received in a keyway in a part to secure the part to a shaft;

FIG. 6 is a cross-sectional view of the pin-key taken along line 6—6 in FIG. 5 showing the engagement between the part and the pin-key, and the pin-key and the shaft;

FIG. 7 is a side view of the tapered pin-key as it would be received in a keyway in a part to secure the part to a shaft, with a cap for preloading the pin-key; and FIG. 8 is a side view of a tapered pin-key as it would be received in a keyway in a part to secure the part to a shaft, the pin-key having a threaded stud for preloading the pin-key.

DETAILED DESCRIPTION OF THE PREFERRED EMBODIMENT

The tapered pin-key 20 of this invention is shown in FIG. 1 as comprising two converging cylindrical faces 22 and 24. Faces 22 and 24 have equal radii. Top 26, as shown in FIG. 2, is circular and bottom 28, as shown in FIG. 4, is generally elliptical. As shown in FIG. 3, top 26 and bottom 28 are perpendicular to face 22. The axes 30 and 32 of faces 22 and 24, respectively, intersect and thus faces 22 and 24 converge toward bottom 28 of pin-key 20. It is preferable that the axes intersect at, and thus the faces converge at, an angle of about between 1° and 11°. And preferably, the axes 30 and 32 intersect at, and faces 22 and 24 converge at, an angle of about 8.5°. Pin-key 20 has a longitudinally extending cavity 33 which defines sidewall 35. Cavity 33 will be described in more detail below.

Pin-key 20 is particularly useful for securing a part to a shaft, as shown in FIG. 5, where part 34 and shaft 36 are secured with pin-key 20. Part 34 is provided with a bore 38 for receiving shaft 36 and a cylindrical keyway 40 perpendicular to the axis of bore 38 and tangentially intersecting bore 38 to depth equal to about the radius of the keyway. The radius of keyway 40 is equal to the radii of faces 22 and 24, and it is preferable that these dimensions are between 40 to 50 percent of the radius of shaft 36. Shaft 36 is provided with a tangential cylindrical groove 42 that is of the same radius as faces 22 and 24 and that is shallower than the depth of the intersection of keyway 40 and bore 38 and is preferably about two-thirds of the radius deep. Thus, keyway 40 intersects bore 38 to a greater depth than groove 42 penetrates shaft 36 so that the cylindrical surface of groove 42 and the surrounding portion of shaft 36 protrudes into keyway 40. The protrusion of shaft 36 into keyway 40 is clearly shown in FIG. 5. Groove 42 is aligned with keyway 40 so that when shaft 36 is properly seated in bore 38, pin-key 20 can be inserted into keyway 40 and into engagement with groove 42.

Sidewall 35, defined by cavity 33, is sufficiently thin so that pin-key 20 can be preloaded to cause pin-key 20 to elastically deform to conform to the surface of keyway 40 and groove 42. Deformation of pin-key 20 is important in that portion where it contacts both keyway 40 and groove 42 in shaft 36. Thus, preferably cavity 33 extends at least through that portion of pin-key 20 that should be elastically deformable, that is that portion of pin-key 20 adjacent to the portion of surface 24 that engages groove 42 in shaft 36. It is more preferable, however, that cavity 33 extends completely through pin-key 20.

The most likely location for misalignment between pin-key 20 and keyway 40 or groove 42 is at the centers of faces 22 and 24. Thus, deformability and consequently the thickness of sidewall 35 at these locations are important. At least in that portion of pin-key 20 adjacent to the portion of surface 24 that engages groove 42 in shaft 36, it is preferable that the thickness of the sidewall 35 at the center of each of the faces 22 and 24 be between $\frac{1}{4}$ and $\frac{3}{4}$ of the radius of that face. It is desirable that the thickness of the sidewall 35 remains relatively constant at any given radial location over the length of pin-key 20, and thus it is desirable that cavity 33 tapers downwardly. It is also desirable that at least through that portion of the pin-key adjacent to the portion of the surface 24 that engages groove 42, that the cross-sectional area of cavity 33 is greater than about 1/16 of the cross-sectional area of pin-key 20.

Pin-key 20 can be preloaded by driving pin-key 20 into wedging engagement in keyway 40. As shown in FIGS. 5 and 6, face 22 conforms to and engages the cylindrical surface of keyway 40 and face 24 conforms to and engages the cylindrical surface of groove 42 with the angle formed between the axes of keyway 40 and groove 42 being the same as the angle of the intersection of axes 30 and 32 and the convergence of faces 22 and 24.

An alternative method of preloading pin-key 20 is shown in FIG. 7. There, part 34 and shaft 36 are as described above, with regard to FIGS. 5 and 6, with corresponding parts identified with the same numerals. However, keyway 40A in FIG. 7 has threads 46 in its top. A retaining plug or cap 48 is threadedly engaged in the top of keyway 40A to retain pin-key 20 and to compress pin-key 20 against the surface of keyway 40A and tangential groove 42 in shaft 36. Cap 48 creates sufficient preloading to cause pin-key 20 to be elastically deformed to conform to keyway 40A and groove 42.

A second alternative method of preloading is shown in FIG. 8. There, part 34 and shaft 36 are as described above with regard to FIGS. 5 and 6, with corresponding parts identified with the same numeral.

Pin-key 20A, shown in FIG. 8, has a threaded stud 50 extending from its bottom, but is otherwise identical to pin-key 20 described above, and corresponding parts are identified with the same numerals. Pin-key 20A operates exactly like pin-key 20 to secure part 34 and shaft 36. When properly placed in keyway 40, stud 50 extends out of keyway 40. A nut 52 is threaded onto stud 50 to retain pin-key 20A, and draw it into engagement with keyway 40 and groove 42. Stud 50 creates sufficient preloading to cause pin-key 20A to be elastically deformed to conform to keyway 40 and groove 42.

OPERATION

The pin-key of this invention, as described above, is particularly suited to mounting a part to a shaft. The part must have a bore for receiving the shaft and a cylindrical keyway perpendicular to the bore's axis and tangentially intersecting the bore. The radius of the keyway is preferably equal to 40 50 percent of the shaft's radius. The shaft has a tangential groove of the same radius as the keyway but shallower than the depth of the intersection of the keyway and bore and preferably about two-thirds of the radius deep. Thus, the keyway intersects the bore to a greater depth than the groove penetrates the shaft so that the cylindrical surface of the groove and the surrounding portion of the shaft protrudes into the keyway. The groove is positioned so that when the shaft is properly seated in the bore, the groove is aligned with the keyway. The radius of faces 22 and 24 are equal to the radius of keyway 40 and to the radius of groove 42 in shaft 36.

Pin-key 20 is easily installed. With shaft 36 properly seated in bore 38 so that groove 42 is aligned with keyway 40, pin-key 20 is inserted into keyway 40 until face 22 firmly engages the surface of keyway 40 and face 24 firmly engages the surface of groove 42. Because of the tapered shape of pin-key 20, pin-key 20 travels into keyway 40 until it firmly engages part 34 and shaft 36. Because of the cylinder-to-cylinder contact between pin-key 20 and keyway 40 on one side and pin-key 20 and groove 42 on the other, the engagement is secure. Pin-key 20 is then preloaded by wedging it in keyway 40, for example by striking it with a hammer. This preloading causes pin-key 20 to elastically deform to conform to the keyway 40 and groove 42. Alternatively, pin-key 20 can be preloaded by mounting it in a keyway 40A, having threads 46 in the top. A cap 48 can then be threaded into keyway 40A to retain pin-key 20 and compress pin-key 20 against keyway 40A and groove 42. In a second alternative, a modified pin-key 20A has a threaded stud 50, which protrudes from the part when pin-key 20A is mounted in keyway 40. Nut 52 can then be threaded into stud 50 to retain pin-key 20A and draw it into keyway 40, preloading pin-key 20A.

The engagement of pin-key 20 in keyway 40 or 40A is sometimes so secure that a threaded tool is inserted into cavity 33 to provide a grip on pin-key 20 to effect its removal.

There are various changes and modifications which may be made to applicant's invention as would be apparent to those skilled in the art. However, any of these changes or modifications are included in the teaching of applicant's disclosure and he intends that his invention be limited only by the scope of the claims appended hereto.

I claim:

1. An elastically conformable tangential tapered pin-key for securing a part to a shaft extending through a bore in the part, the pin-key adapted to fit into a cylindrical keyway tangentially intersecting the bore and to engage a tangential cylindrical groove in the shaft shallower than the intersection of the keyway and the bore, the pin-key comprising a first cylindrical face and a second cylindrical face that converge toward the bottom of the pin-key, and a longitudinally extending cavity defining sidewalls sufficiently thin to allow the faces to elastically deform, the first face conforming to and engaging the surface of the keyway and the second face conforming to and engaging the surface of the groove in the shaft.

2. The pin-key of claim 1 wherein the cavity extends substantially through that portion of the pin-key adjacent to the portion of the second surface that engages the groove in the shaft.

3. The pin-key of claim 2 wherein the wall thickness at the center of each face, in that portion of the pin-key adjacent to the portion of the second face that engages the groove in the shaft, is between about ¼ and ⅜ and of the radius of that face.

4. The pin-key of claim 1 wherein the cross-sectional area of the cavity is greater than about 1/16 of the cross-sectional area of the pin-key, in that portion of the pin-key adjacent to the portion of the second face that engages the groove in the shaft.

5. The pin-key of claim 1 wherein the pin-key is made from cast metal.

6. The pin-key of claim 1 wherein the axial cavity extends completely through the pin-key.

7. The pin-key of claim 1 further comprising a threaded stud projecting from the bottom of the pin-key.

8. In combination:
a shaft;
a part bored to fit the shaft and mounted thereon;
a cylindrical keyway in the part tangentially intersecting the bore;
a tangential cylindrical groove in the shaft shallower than the intersection of the keyway and the bore;
an elastically conformable tangential tapered pin-key mounted in the keyway and engaging the tangential cylindrical groove, the pin-key having a first cylindrical face and a second cylindrical face that converge toward the bottom of the pin-key, and a longitudinally extending cavity defining sidewalls sufficiently thin to allow the faces to elastically deform to conform to the surface of the keyway and groove, the pin-key being preloaded so that the first face conforms to and engages the surface of the keyway and the second face conforms to and engages the surface of the groove in the shaft.

9. The combination of claim 8 further comprising threads in the top of the keyway and a cap threadedly engagable in the keyway to retain the pin-key in the keyway and compress it against the surface of the keyway and the surface of the tangential groove in the shaft, to preload the pin-key.

10. The combination of claim 8 further comprising a threaded stud projecting from the bottom of the pin-key, the stud being sufficiently long to protrude from the part when the pin-key is mounted in the keyway, and a nut threaded onto the stud to retain the pin-key in the keyway and to draw the pin-key into engagement with the surface of the keyway and the surface of the cylindrical groove in the shaft, to preload the pin-key.

11. The pin-key of claim 8 wherein the cavity extends substantially through that portion of the pin-key adjacent to the portion of the second surface that engages the groove in the shaft.

12. The pin-key of claim 11 wherein the wall thickness at the center of each face, in that portion of the pin-key adjacent to the portion of the second face that engages the groove in the shaft, is between about $\frac{1}{4}$ and $\frac{3}{4}$ of the radius of that face.

13. The pin-key of claim 8 wherein the cross-sectional area of the cavity is greater than about 1/16 of the cross-sectional area of the pin-key, in that portion of the pin-key adjacent to the portion of the second face that engages the groove in the shaft.

14. A structure for coupling a part to a shaft extending through a bore in the part, the structure comprising:
   a cylindrical keyway in the part tangentially intersecting the bore;
   a tangential cylindrical groove in the shaft, shallower than the intersection of the keyway and the bore; and,
   a conformable tangential tapered pin-key mounted in the keyway and engaging the tangential cylindrical groove in the shaft, and pin-key having a first cylindrical face and a second cylindrical face that converge toward the bottom of the pin-key, and a longitudinally extending cavity defining sidewalls sufficiently thin to allow the faces to elastically deform to conform to the surface of the keyway and groove; and,
   means for preloading the pin-key in the keyway so that the first face conforms to and engages the surface of the keyway and the second face conforms to and engages the surface of the groove in the shaft.

15. The combination of claim 14 wherein the means for preloading the pin-key comprises threads in the top of the keyway and a cap threadedly engagable in the keyway to retain the pin-key in the keyway and compress it against the surface of the keyway and the surface of the tangential groove in the shaft.

16. The combination of claim 14 wherein the means for preloading the pin-key comprises a threaded stud projecting from the bottom of the pin-key, the stud being sufficiently long to protrude from the part when the pin-key is mounted in the keyway, and a nut threaded onto the stud to retain the pin-key in the keyway and to draw the pin-key into engagement with the surface of the keyway and the surface of the cylindrical groove in the shaft.

17. The pin-key of claim 14 wherein the cavity extends substantially through that portion of the pin-key adjacent to the portion of the second surface that engages the groove in the shaft.

18. The pin-key of claim 14 wherein the wall thickness at the center of each face, in that portion of the pin-key adjacent to the portion of the second face that engages the groove in the shaft, is between about $\frac{1}{4}$ and $\frac{3}{4}$ of the radius of that face.

19. The pin-key of claim 14 wherein the cross-sectional area of the cavity is greater than about 1/16 of the cross-sectional area of the pin-key, in that portion of the pin-key adjacent to the portion of the second face that engages the groove in the shaft.

* * * * *